United States Patent
Nakamura

[19]

[11] Patent Number: 5,842,045
[45] Date of Patent: Nov. 24, 1998

[54] TERMINAL UNIT HAVING A UNIVERSAL MULTI-PROTOCOL MODULAR JACK AUTOMATICALLY SETS ITS PROTOCOL TO MATCH WITH PROTOCOL OF A MODULAR PLUG CONNECTING TO THE JACK

[75] Inventor: Noriyasu Nakamura, Tokyo, Japan

[73] Assignee: NEC Corporation, Tokyo, Japan

[21] Appl. No.: 694,680

[22] Filed: Aug. 9, 1996

[30] Foreign Application Priority Data

Aug. 14, 1995 [JP] Japan ................................. 7-228572

[51] Int. Cl.⁶ ................................................. G06F 13/00
[52] U.S. Cl. ............................................ 395/883; 395/882
[58] Field of Search ........................... 395/200.58, 200.8, 395/834, 831, 883, 882; 439/488, 489, 490, 491, 217, 218, 676; 340/825.3

[56] References Cited

U.S. PATENT DOCUMENTS

| | | | |
|---|---|---|---|
| 4,224,485 | 9/1980 | Krumreich | 200/51.1 |
| 4,699,443 | 10/1987 | Goodrich et al. | 439/188 |
| 5,212,774 | 5/1993 | Grider et al. | 395/309 |
| 5,265,239 | 11/1993 | Ardolino | 395/500 |
| 5,546,549 | 8/1996 | Barrett et al. | 395/309 |
| 5,548,727 | 8/1996 | Meehan | 395/200.51 |
| 5,581,708 | 12/1996 | Iijima | 395/831 |
| 5,590,313 | 12/1996 | Reynolds et al. | 395/500 |
| 5,613,096 | 3/1997 | Danknick | 395/500 |
| 5,671,355 | 9/1997 | Collins | 395/200.8 |

FOREIGN PATENT DOCUMENTS 0596648  5/1994  European Pat. Off. .

OTHER PUBLICATIONS

Tsukamoto Yuji, "Communication Equipment," Patent Abstracts Of Japan, vol. 018, No. 342 (E–1570), Jun. 28, 1994.

*Primary Examiner*—Le Hien Luu
*Attorney, Agent, or Firm*—Sughrue, Mion, Zinn, Macpeak & Seas, PLLC

[57] ABSTRACT

A terminal unit of the present invention and applicable to a wired services network distinguishes two or more different kinds of plugs possibly connected to its general-purpose modular jack, reads a particular protocol matching the plug out of its storage, and then sets the protocol as its own protocol. Therefore, a plurality of data terminals each having a particular protocol can share a single terminal unit. In addition, a protocol adequate for a desired data terminal can be automatically set. This enhances the convenient use of terminal equipments.

12 Claims, 4 Drawing Sheets

TERMINAL UNIT HAVING A UNIVERSAL MULTI-PROTOCOL MODULAR JACK AUTOMATICALLY SETS ITS PROTOCOL TO MATCH WITH PROTOCOL OF A MODULAR PLUG CONNECTING TO THE JACK

BACKGROUND OF THE INVENTION

The present invention relates to a terminal unit for a wired services network and, more particularly, to a terminal unit to be shared by a plurality of data terminals each having a particular connection terminal structure and a particular protocol.

Today, due to the advent of miniature and handy data terminals, there is an increasing demand for a wired services network allowing each data terminal to be operated at various locations. However, in a conventional wired services system, terminal units situated at various locations are each provided only with a single modular jack matching a particular protocol assigned to the terminal unit. Therefore, a data terminal cannot be connected to a terminal unit unless the former shares the same protocol as the latter. To promote the efficient use of data terminals, a plurality of terminal units each having a particular protocol and a particular modular jack must be situated at each location. This results in an increase in installation cost.

Apart from the cost aspect, the user of a data terminal must connect it to desired one of the multiple terminal units while surely finding a modular jack matching the modular plug of the data terminal, resulting in troublesome operation. Moreover, a modular jack for a public two-wire or four-wire line may not be correctly electrically connected to the corresponding plug although the connection may be mechanically correct. Should the user of the data terminal be not informed of an incorrect electrical connection, various kinds of troubles would occur.

SUMMARY OF THE INVENTION

It is therefore an object of the present invention to provide a terminal unit for a wired services network and allowing a data terminal to be connected thereto without regard to its protocol, and automatically setting up a protocol matching the data terminal.

A terminal unit of the present invention has a general-purpose modular jack capable of accommodating any one of a plurality of kinds of modular plugs. An identifying section identifies the kind of the modular plug connected to the modular jack. A storage device stores a plurality of protocols each corresponding to the respective modular plug. A protocol converter reads, based on the output of the identifying section, the protocol matching the kind of the modular plug connected to the modular jack, and then sets the protocol as a protocol of the terminal unit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
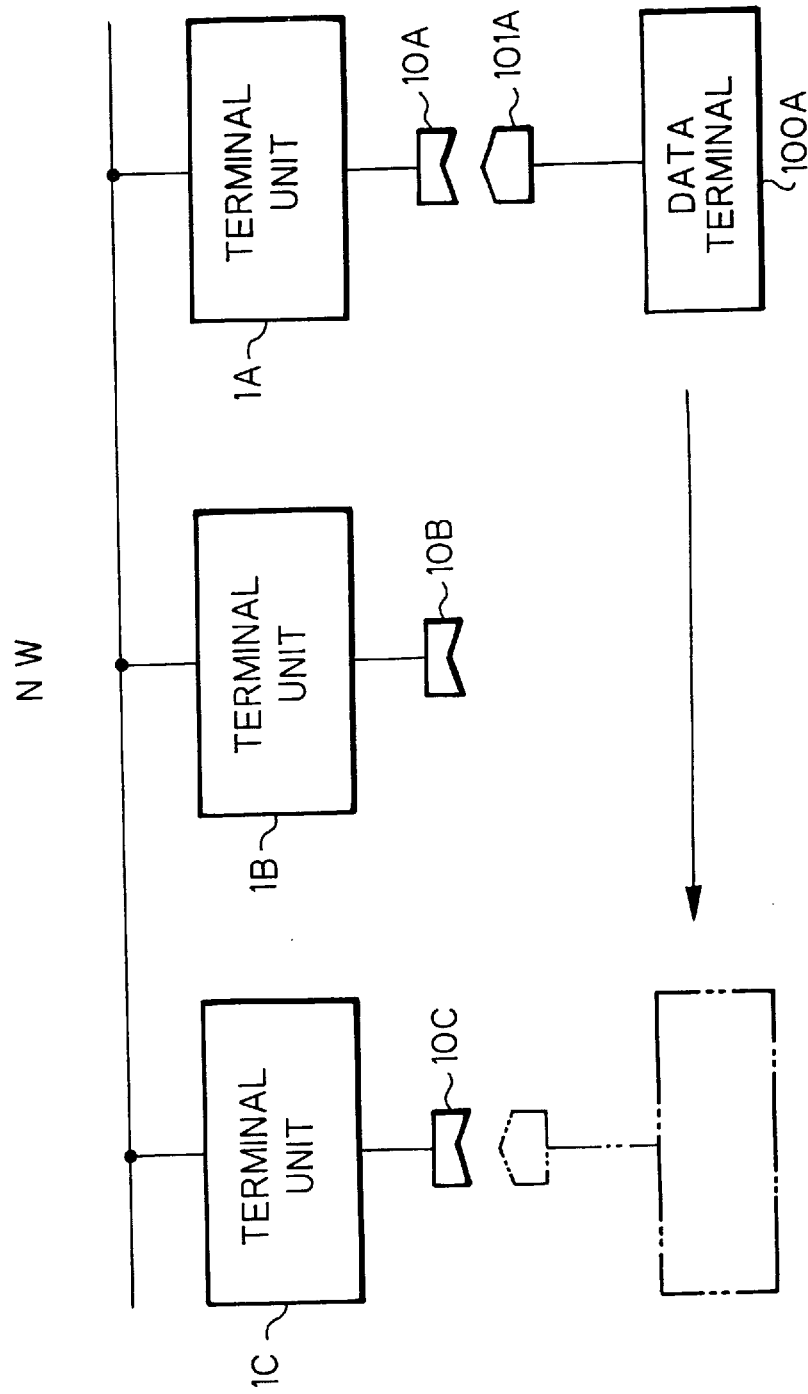
FIG. 1 is a block diagram schematically showing a wired services network including conventional terminal units.

To better understand the present invention, a brief reference will be made to a wired services network including conventional terminal units each having a particular connection terminal structure assigned to a particular protocol, shown in FIG. 1. Assume that three different protocols PR1, PR2 and PR3 are available with a wired services network NW. Then, as shown in FIG. 1, terminal units 1A, 1B and 1C connected to the network NW are each exclusively provided with one of three different modular jacks 10A, 10B and 10C. The modular jacks 10A, 10B and 10C may be respectively assigned to Ethernet, public two-wire line, and public four-wire line, respectively, by way of example. In this condition, only if the user of a data terminal 100A having a modular plug 101A connects it to the modular jack of the matching terminal unit 10A, 10B or 10C, the user can receive a wired service based on the preselected protocol.

However, the problem with the above terminal units 1A–1C is that because each of them is provided only with a modular jack matching a particular protocol, the data terminal 100A cannot be used if it is different in protocol from the terminal unit.

Figure 2:
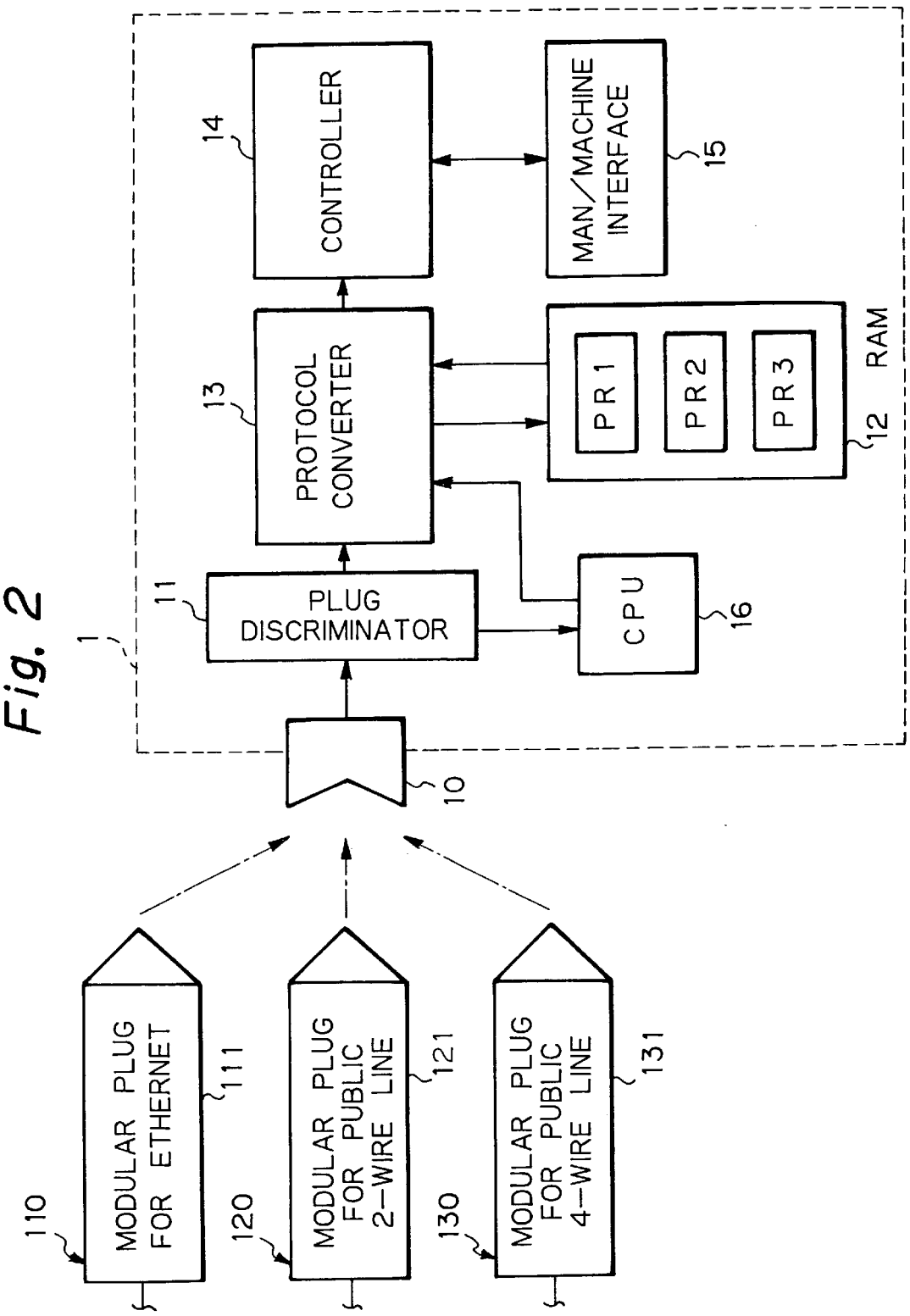
FIG. 2 is a block diagram schematically showing a terminal unit embodying the present invention.

Referring to FIG. 2, a terminal unit embodying the present invention is shown. As shown, the terminal unit, generally 1, has a general-purpose modular jack 10 capable of receiving any one of modular plugs 111, 121 and 131 of different data terminals 110, 120 and 131. In the illustrative embodiment, the modular plugs 111, 121 and 131 are respectively assigned to Ethernet, public two-wire line, and public four-wire line, respectively. The terminal unit 1 includes a plug discriminator 11 for identifying any one of the three different modular plugs 111, 121 and 131 connected to the modular jack 10.

A RAM (Random Access Memory) 12 stores three kinds of protocols PR1, PR2 and PR3 respectively corresponding to the data terminals 110, 120 and 130. When one of the plugs 111, 121 and 131 is connected to the jack 10 as identified by the plug discriminator 11, a protocol converter 13 selects one of the protocols RP1, RP2 and PR3 in response to the output of the discriminator 11. The protocol selected is input to a controller 14 and used to process signals input and output via the jack 10. A man/machine interface 15 and a CPU (Central Processing Unit) 16 for controlling the terminal unit 1 are also built in the unit 1.

Figure 3A:
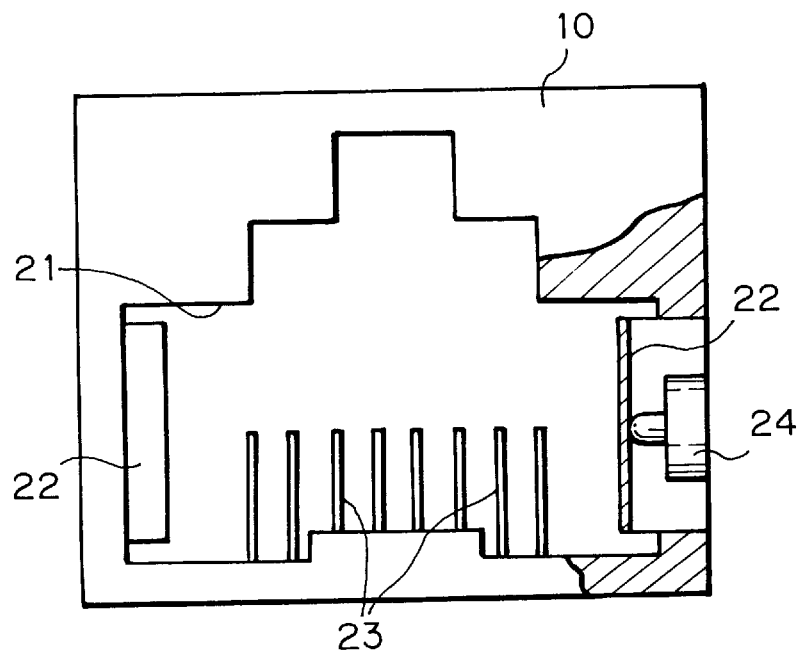
FIG. 3A is a partially sectioned front view of a modular jack included in the embodiment.
Figure 3B:
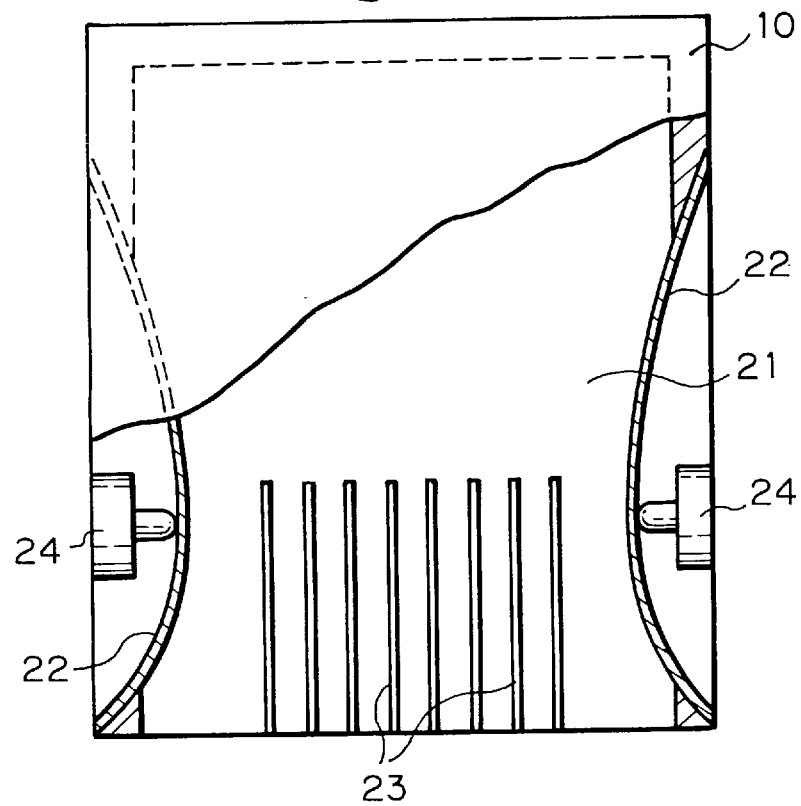
FIG. 3B is a plan view of the modular jack shown in FIG. 3A.

As shown in FIGS. 3A and 3B, the modular jack 10 has a bore 21 for receiving the modular plugs 111, 121 and 131. The width of the bore 21 is great enough to accommodate the largest modular plug 111 assigned to Ethernet. A pair of spaced leaf springs 22 are positioned at opposite sides of the bore 21. In an unstressed condition, the leaf springs 22 protrude toward each other to form a space corresponding in size to the modular plugs 121 and 131 which are smaller than the modular plug 111. A plurality of connection pins 23 are provided on the jack 10 to be connected to the modular plug 111, 121 or 131. The number of the pins 23 is the same as the largest number of terminals which the plug 111, 121 or 131 has.

A microswitch 24 is positioned between one side wall of the jack 10 and one of the two leaf springs 22. When the leaf springs 22 are convex toward each other due to the absence of the Ethernet plug 111, the microswitch 24 remains in its OFF state. When the Ethernet plug 111 is inserted into the jack 10 while causing the leaf springs 22 to resiliently deform outward, the leaf spring 22 adjoining the microswitch 24 brings it to its ON state.

The plug discriminator 11 monitors the electrical connection states of the microswitch 24 and pins 23. When the microswitch 24 is turned on by the adjoining leaf spring 22, it is possible to determines that the Ethernet plug 111 has been inserted into the jack 10. When the microswitch 24 is not turned on, it is possible determine that either one of the two- and four-wire plugs 121 and 131 has been inserted into the jack 10 on the basis of the number pins 23 electrically connected to the terminals of the plug 121 or 131. Specifically, when two pins 23 are electrically connected to the plug, the plug is determined to be the two-wire plug 121. When four pins 23 are electrically connected to the plug, the plug is determined to be the four-wire plug 131.

Figure 4:
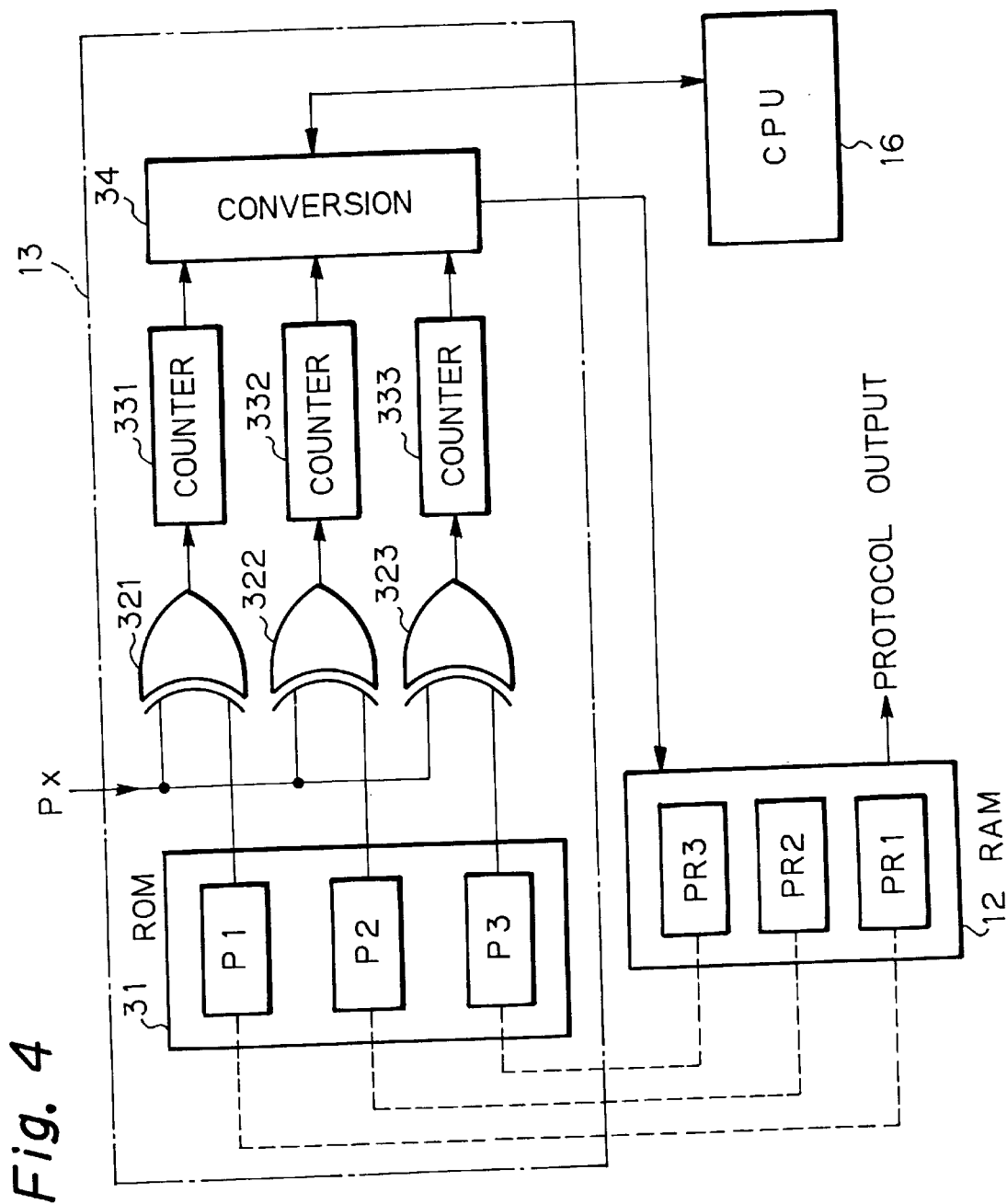
FIG. 4 is a block diagram schematically showing a specific configuration of a protocol converter included in the embodiment.

As shown in FIG. 4 specifically, the protocol converter 13 has a ROM 31 storing three different synchronizing patterns P1, P2 and P3 representative of three different protocols. Exclusive OR (EXOR) gates 321, 322 and 323 respectively compare the synchronizing pattern Px of an input signal with the synchronizing patterns P1, P2 and P3 read out of the ROM 31. As a result, one of the patterns P1–P3 coincident with the pattern Px is selected. Specifically, the output of each of the EXOR gates 321–323 goes low if the respective pattern P1, P2 or P3 is coincident with the pattern Px or goes high if the former is not coincident with the latter.

The outputs of the EXOR gates 321–323 are connected to counters 331–333, respectively. A conversion 34 is responsive to the output of any one of the counters 321–323 and representative of N consecutive low levels, taking account of an N-bit error. The resulting output of the conversion 34 is input to the CPU 16. In response, the CPU 16 returns a convert signal to the conversion 34. Consequently, the conversion 34 selects one of the patterns P1–P3 corresponding to the above counter. Then, the conversion 34 reads one of the protocols PR1–PR3 corresponding to the above pattern out of the RAM 12 and delivers it to the controller 14. The controller 14 therefore processes signals on the basis of the received protocol.

In operation, assume that the data terminal 120 with the two-wire modular plug 121 is connected to the terminal unit 1 via the modular jack 10. Then, because the microswitch 24 remains in its OFF state and because two of the pins 23 are electrically connected to the plug 121, the plug discriminator 11 determines that plug 121 has been inserted into the jack 10. The resulting output of the plug discriminator 11 is sent to the CPU 16.

When a signal is input from the data terminal 120 to the terminal unit 1 via the jack 10, the protocol converter 13 causes its EXORs 321–323 to compare the synchronizing pattern Px of the input signal with the synchronizing patterns P1–P3 stored in the ROM 31. In this specific case, the synchronizing pattern Px and P2 compare equal. The counter 332 therefore counts N consecutive coincidences. On receiving the output of the counter 332 representative of N coincidences, the CPU 16 determines that the pattern Px of the protocol is coincident with the pattern P2. The CPU 16 makes a final decision with the output of the plug discriminator 11 and that of the protocol converter 13, and returns a signal representative of the result of the final decision to the protocol converter 13. In response, the protocol converter 13 reads the protocol PR2 stored in the RAM 12 and sends it to the controller 14. The controller 14 processes signals on the basis of the protocol PR2. In the same manner, when the four-wire plug 131 or the Ethernet plug 111 is inserted into the jack 10, the terminal unit 1 identifies it and selects the corresponding protocol.

In the embodiment described above, only if the user of any one of the data terminals 110–130 inserts its plug 111, 121 or 131 into the jack 10 of the terminal unit 1, the unit 1 automatically sets up the protocol matching the data terminal and processes signals with the protocol. Therefore, a single terminal unit 1 situated at each location of a wired services network can be shared by all the data terminals without regard to the kind of protocol. This enhances the convenient use of data terminals.

In the illustrative embodiment, an adequate protocol is selected on the basis of the kind of the modular plug inserted into the modular jack 10 and the synchronizing pattern of a signal actually input. This insures adequate protocol setting at all times. If the protocols and modular plugs surely have one-to-one correspondence, then one of the protocols may be set up only by determining the kind of the modular plug in order to simplify the terminal unit 1. In such a case, the RAM 12 will be directly driven by the convert signal output from the CPU 16.

In summary, in accordance with the present invention, a terminal unit for a wired services network distinguishes two or more different kinds of modular plugs possibly connected to its general-purpose modular jack, reads a particular protocol matching the plug out of its storage, and then sets the protocol as its own protocol. Therefore, a plurality of data terminals each having a particular protocol can share a single terminal unit. In addition, a protocol adequate for a desired data terminal can be automatically set. This enhances the convenient use of terminal equipment.

Various modifications will become possible for those skilled in the art after receiving the teachings of the present disclosure without departing from the scope thereof.

What is claimed is:

1. A terminal unit comprising:
   a general-purpose modular jack capable of accommodating any one of a plurality of kinds of modular plugs;
   identifying means for identifying the kind of the modular plug connected to said modular jack;
   storing means for storing a plurality of protocols each corresponding to a respective kind of modular plug; and
   protocol converting means for reading, based on an output of said identifying means, a matching protocol that matches the kind of the modular plug connected to said modular jack, and then setting said matching protocol as a protocol of said terminal unit.

2. A terminal unit as claimed in claim 1, wherein said identifying means identifies the kind of the modular plug on the basis of an ON/OFF state of a switch mounted on said modular jacket and actuated on the basis of a difference in size between the modular plugs, and a number of pins electrically connected when the modular plug is connected to said modular jack.

3. A terminal unit as claimed in claim 2, wherein said switch takes an ON state when the modular plug assigned to Ethernet is inserted into said modular jack or takes an OFF state when the modular plug assigned to a public line is inserted into said modular jack, and wherein a particular number of pins are connected when each of the modular plug assigned to a public two-wire line and the modular plug assigned to a public-four wire line is connected.

4. A terminal unit as claimed in claim 3, wherein said protocol converting means comprises means for storing protocol synchronizing patterns each corresponding to a particular protocol, compares a protocol synchronizing pattern of signals input and output, and determines the matching protocol when any one of stored protocol synchronizing patterns coincides with the protocol pattern of signals input and output.

5. A terminal unit as claimed in claim 4, wherein said terminal unit is connected to a wired services network and sets, when the modular plug of any one of a plurality of data terminals each having a particular protocol is inserted into said modular jack, the protocol of the data terminal as a protocol of said terminal unit.

6. A terminal unit as claimed in claim 3, wherein said terminal unit is connected to a wired services network and sets, when the modular plug of any one of a plurality of data terminals each having a particular protocol is inserted into said modular jack, the protocol of the data terminal as a protocol of said terminal unit.

7. A terminal unit as claimed in claim 2, wherein said protocol converting means comprises means for storing protocol synchronizing patterns each corresponding to a particular protocol, compares a protocol synchronizing pattern of signals input and output, and determines the matching protocol when any one of stored protocol synchronizing patterns coincides with the protocol pattern of signals input and output.

8. A terminal unit as claimed in claim 7, wherein said terminal unit is connected to a wired services network and sets, when the modular plug of any one of a plurality of data terminals each having a particular protocol is inserted into said modular jack, the protocol of the data terminal as a protocol of said terminal unit.

9. A terminal unit as claimed in claim 2, wherein said terminal unit is connected to a wired services network and sets, when the modular plug of any one of a plurality of data terminals each having a particular protocol is inserted into said modular jack, the protocol of the data terminal as a protocol of said terminal unit.

10. A terminal unit as claimed in claim 1, wherein said protocol converting means comprises means for storing protocol synchronizing patterns each corresponding to a particular protocol, compares a protocol synchronizing pattern of signals input and output, and determines the matching protocol when any one of stored protocol synchronizing patterns coincides with the protocol pattern of signals input and output.

11. A terminal unit as claimed in claim 10, wherein said terminal unit is connected to a wired services network and sets, when the modular plug of any one of a plurality of data terminals each having a particular protocol is inserted into said modular jack, the protocol of the data terminal as a protocol of said terminal unit.

12. A terminal unit as claimed in claim 1, wherein said terminal unit is connected to a wired services network and sets, when the modular plug of any one of a plurality of data terminals each having a particular protocol is inserted into said modular jack, the protocol of the data terminal as a protocol of said terminal unit.

* * * * *